June 24, 1930.                E. L. HARRINGTON                1,767,070
                                   SHEAVE
                              Filed Oct. 29, 1926

Edward L. Harrington
                INVENTOR.
BY
        ATTORNEYS.

Patented June 24, 1930

1,767,070

UNITED STATES PATENT OFFICE

EDWARD L. HARRINGTON, OF ERIE, PENNSYLVANIA, ASSIGNOR TO G. H. WILLIAMS COMPANY, OF ERIE, PENNSYLVANIA, A CORPORATION OF PENNSYLVANIA

SHEAVE

Application filed October 29, 1926. Serial No. 144,960.

Sheaves, particularly those used for digging implements are subjected to very severe conditions particularly as to lubrication. They are often operated in a cloud of dust which, if not prevented, works into the bearing surfaces and this decreases the life of the sheave. The present invention is designed to improve the sheave so as to protect the working bearing. Features and details of the invention will appear from the specification and claims.

The invention is illustrated in the accompanying drawings as follows:—

Figure 1:
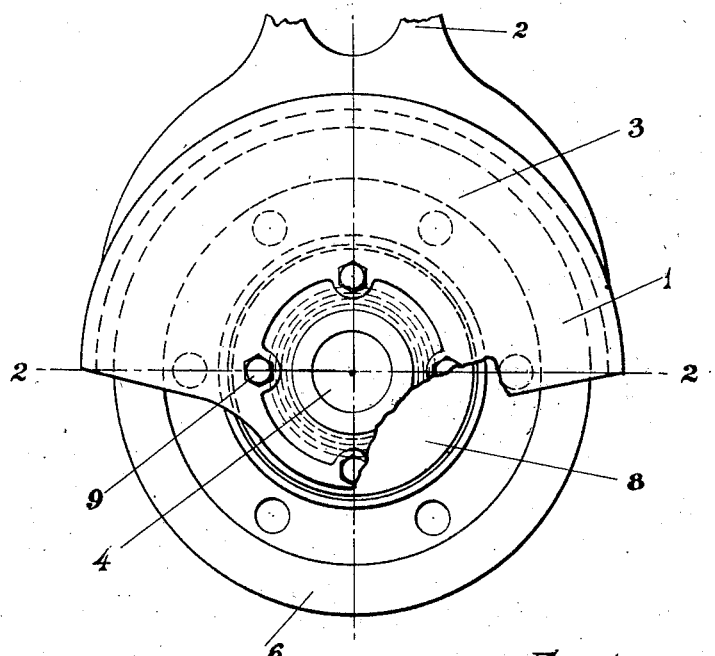
Fig. 1 shows a side elevation of the sheave, parts being broken away to better show construction.
Figure 2:
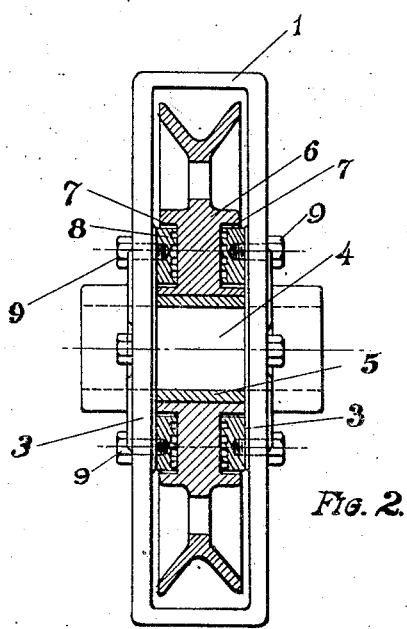
Fig. 2 is a section on the line 2—2 in Fig. 1.

1 marks the sheave block having a suspending loop 2 and cheeks 3.

A sheave pin 4 is mounted in the cheeks 3 extending across the space between the cheeks and an ordinary bearing bushing 5 is arranged on the pin.

A sheave pulley 6 is journaled on the bushing 5. It is provided with annular grooves 7 on its outer faces and annular rings 8 extend into these grooves and are secured to the side cheeks by bolts 9. The faces of the rings 8 are provided with alternate ribs and grooves which are opposed to and arranged in sealing relation to the face of the sheave pulley at the bottom of the annular groove. These annular ribs and grooves obstruct the settling of dust, or dirt on the bearing and as the sheave is rotated the centrifugal force gradually tends to force material outwardly from groove to groove rather than inwardly and thus whatever movement there is is away from the bearing. By making the rings removable the sheave with the rings in place can be assembled between the cheeks and the pin 4 can be passed through one cheek, the pulley, and into place in the other cheek, thus assembling the device. After the parts are in place the rings may be secured by the bolts 9.

What I claim as new is:—

1. In a sheave, the combination of a sheave block having side cheeks; a sheave pin mounted in the cheeks; a sheave pulley journaled on the pin; and annular rings detachably mounted in the cheeks and provided with ribbed and grooved faces arranged in sealing relation with the sides of the pulley.

2. In a sheave, the combination of a sheave block having side cheeks; a sheave pin mounted in the cheeks; and a sheave pulley journaled on the pin, the pulley and cheeks forming opposing members of a sealing device comprising ribs and grooves on one of said members and a plane opposing surface on the other member engaging said ribs.

3. In a sheave, the combination of a sheave block having side cheeks; a sheave pin mounted in the cheeks; and a sheave pulley journaled on the pin, said cheeks being provided with annular ribs having grooves between them and the pulley being provided with an opposing plane surface engaging the ribs, said ribs and groove surfaces in connection with the opposing plane surface forming a seal between the cheeks and pulley.

4. In a sheave, the combination of a sheave block having side cheeks; a sheave pin mounted in the cheeks; and a sheave pulley journaled on the pin and having annular grooves in its side faces, the bases of the grooves forming plane surfaces, the cheeks being provided with annular rings extending into the grooves in the pulleys, the inner faces of the annular rings being formed with ribs and grooves, said ribs engaging the plane surfaces forming the bases of the grooves in the pulley.

In testimony whereof I have hereunto set my hand.

EDWARD L. HARRINGTON.